(12) United States Patent
Momino (10) Patent No.: US 10,260,477 B2
(45) Date of Patent: Apr. 16, 2019

(54) IGNITION DEVICE OF ENGINE (71) Applicant: KABUSHIKI KAISHA TOYOTA JIDOSHOKKI, Kariya-shi, Aichi-ken (JP)

(72) Inventor: Hiroshi Momino, Aichi-ken (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 9 days.

(21) Appl. No.: 15/078,449

(22) Filed: Mar. 23, 2016

(65) Prior Publication Data

US 2016/0281672 A1 Sep. 29, 2016

(30) Foreign Application Priority Data

Mar. 26, 2015 (JP) .................. 2015-064502

(51) Int. Cl.
*F02P 3/04* (2006.01)
*F02P 5/15* (2006.01)
*F02P 5/145* (2006.01)
*G01M 15/11* (2006.01)
(Continued)

(52) U.S. Cl.
CPC .............. *F02P 5/151* (2013.01); *F02P 5/145* (2013.01); *F02P 17/00* (2013.01); *G01M 15/11* (2013.01);
(Continued)

(58) Field of Classification Search
CPC .......... F02P 5/145; F02P 17/00; F02P 3/0407; F02P 5/151; G01M 15/11; F02D 41/1498; F02D 2200/1015; F02D 41/22
(Continued)

(56) References Cited

U.S. PATENT DOCUMENTS 5,804,711 A * 9/1998 Remboski .............. G01M 15/11
73/114.05
7,188,023 B1 * 3/2007 O'Daniel ............ F02D 41/0087
123/406.14
(Continued)

FOREIGN PATENT DOCUMENTS

JP 09-170545 A 6/1997
JP 09170545 A * 6/1997
(Continued)

OTHER PUBLICATIONS

JP 09170545 A English Translation.*
(Continued)

*Primary Examiner* — Joseph J Dallo
*Assistant Examiner* — Scott A Reinbold
(74) *Attorney, Agent, or Firm* — Sughrue Mion, PLLC (57) ABSTRACT

An ignition device of an engine includes a control unit and an igniter including an ignition coil having a primary and a secondary winding. Supply and stop of a current to the primary winding are performed based on the ignition signal to generate high voltage in the secondary winding thereby to cause a spark to a spark plug provided for a cylinder of the engine. The control unit includes an engine speed variation detector that detects an engine speed variation. The control unit determines a misfire occurs in the cylinder when the engine speed variation is at or higher than a first threshold and smaller than a second threshold that is greater than the first threshold. The control unit determines an abnormality occurs in the igniter in the cylinder when the engine speed variation is at or higher than the second threshold.

3 Claims, 5 Drawing Sheets (51) Int. Cl.
*F02P 17/00* (2006.01)
*F02D 41/14* (2006.01)
*F02D 41/22* (2006.01)

(52) U.S. Cl.
CPC .......... *F02D 41/1498* (2013.01); *F02D 41/22* (2013.01); *F02D 2200/1015* (2013.01); *F02P 3/0407* (2013.01)

(58) Field of Classification Search
USPC ..................................... 123/406.11, 406, 140
See application file for complete search history.

(56) References Cited

U.S. PATENT DOCUMENTS

| | | | |
|---|---|---|---|
| 7,503,207 B2* | 3/2009 | Nishigaki | G01M 15/11 73/114.02 |
| 2010/0294027 A1* | 11/2010 | Kondo | F02D 41/1498 73/114.02 |
| 2011/0202260 A1* | 8/2011 | Cunningham | F02D 35/02 701/104 |

FOREIGN PATENT DOCUMENTS

| WO | 2006/075766 A1 | 7/2006 |
|---|---|---|
| WO | 2009/093296 A1 | 7/2009 |

OTHER PUBLICATIONS

JP 09170545 A English Translation (Year: 1997).*
Communication dated Aug. 5, 2016 from the European Patent Office in counterpart application No. 16160816.1.

* cited by examiner

IGNITION DEVICE OF ENGINE

BACKGROUND OF THE INVENTION

The present invention relates to an ignition device of an engine.

In an ignition device of a gasoline combustion engine, a spark plug that is provided for each cylinder is connected to an igniter, and the spark plug is energized by turning on and off the primary electric current to a primary winding of the igniter thereby to generate a high voltage in a secondary winding of the ignition coil, with the result that air-fuel mixture is ignited. Japanese Patent Application Publication No. H09-170545 discloses an igniter having an abnormality detection circuit that measures electric current for detecting malfunction of the igniter.

In the case where an igniter having an abnormality detecting circuit cannot be used because of the mounting restriction in the gasoline engine, malfunction or abnormality of the spark plug that is not directly electrically connected may not detected. In addition, the use of the abnormality detection circuit increases the cost of the igniter.

The present invention, which has been made in light of the above-described problems, is directed to providing an ignition device of an engine that can detect the abnormality using an igniter without an abnormality detecting circuit.

SUMMARY OF THE INVENTION

In accordance with an aspect of the present invention, there is provided an ignition device of an engine including a control unit generating an ignition signal and an igniter including an ignition coil having a primary winding and a secondary winding. Supply and stop of a current to the primary winding are performed based on the ignition signal from the control unit to generate high voltage in the secondary winding thereby to cause a spark to a spark plug provided for a cylinder of the engine. The control unit includes an engine speed variation detector that detects an engine speed variation. The control unit determines a misfire occurs in the cylinder when the engine speed variation is at or higher than a first threshold and smaller than a second threshold that is greater than the first threshold. The control unit determines an abnormality occurs in the igniter in the cylinder when the engine speed variation is at or higher than the second threshold.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE EMBODIMENTS

Figure 1:
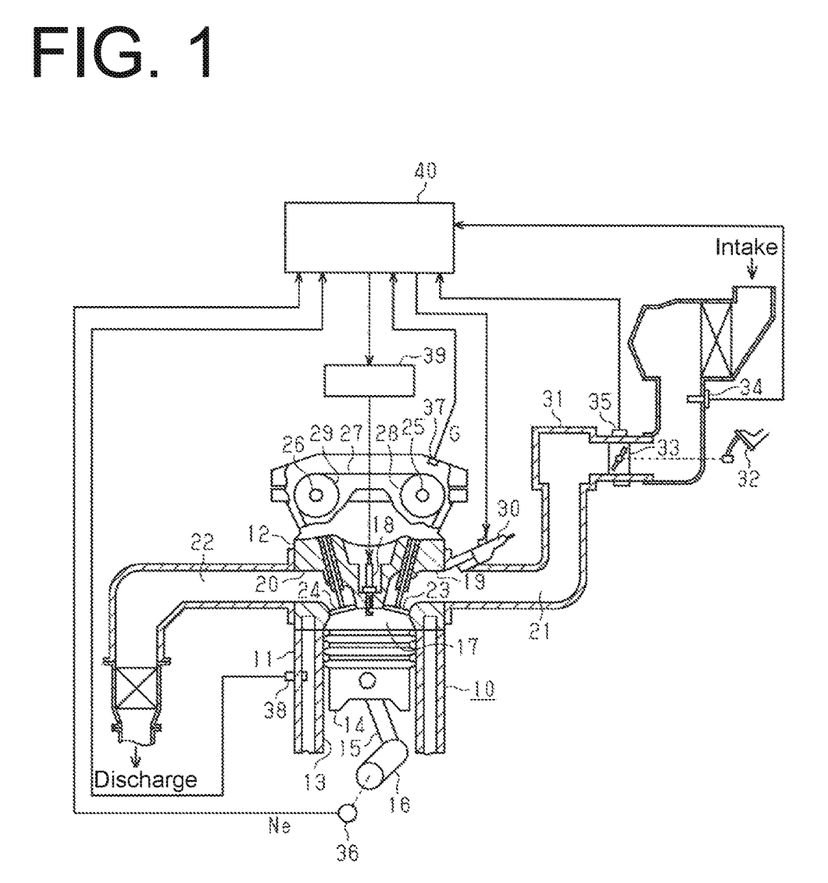
FIG. 1 is a schematic view of an engine and an ignition device according to an embodiment of the present invention.

The following will describe an embodiment of the present invention with reference to the accompanying drawings. Referring to FIG. 1, there is shown a four cylinder gasoline engine 10 (hereinafter referred to as engine) that includes a cylinder block 11 having formed therein four cylinder bores 13 and a cylinder head 12. Each cylinder bore 13 has therein a slidable piston 14 that is connected to a crank shaft 16 via a connecting rod 15. A combustion chamber 17 is defined in the cylinder bore 13 by the piston 14 and the cylinder head 12. A spark plug 18 is fitted in the cylinder head 12 for each cylinder (combustion chamber 17). Additionally, the cylinder head 12 has therein an intake port 19 and an exhaust port 20 that are connected to the combustion chamber 17. The intake port 19 and the exhaust port 20 are connected to an intake passage 21 and an exhaust passage 22, respectively.

An intake valve 23 is disposed at the opening of the intake port 19 that is connected to the combustion chamber 17. An exhaust valve 24 is disposed at the opening of the exhaust valve 24 that is connected to the combustion chamber 17. The intake valve 23 and the exhaust valve 24 are opened and closed by cam shafts 25, 26, respectively, that are driven by the crank shaft 16 through a timing belt 27 and respective timing pulleys 28, 29.

An injector 30 is provided for each cylinder at a position that is adjacent to the intake port 19 for injecting fuel. Fuel at a specified pressure is supplied to each injector 30 through a fuel supply system (not shown).

When the engine 10 is started, intake air introduced into the intake passage 21 is mixed with fuel injected by the injector 30 thereby to form air-fuel mixture. During the intake stroke of the engine 10, the intake port 19 is opened by the intake valve 23 and the air-fuel mixture is drawn through the intake port 19 into the combustion chamber 17 and ignited by the spark plug 18, with the result that the engine 10 delivers power. Exhaust gas produced by combustion of the air-fuel mixture is released into the exhaust passage 22 through the exhaust valve 24 then opened.

The intake passage 21 has with a surge tank 31 and a throttle valve 33 that is opened and closed by operating an accelerator pedal 32 that is disposed upstream of the surge tank 31. The flow of air introduced to the intake passage 21 is controlled by the degree of the opening of the throttle valve 33. The volume of the intake air flowing through the intake passage 21 is detected constantly by an airflow meter 34 that is disposed further upstream of the throttle valve 33.

The engine 10 has a throttle sensor 35 disposed at a position that is adjacent to the throttle valve 33 so as to detect the opening of the throttle valve 33 and to generate a signal that corresponds to the throttle opening. The engine 10 further has a crank shaft sensor 36, a cam shaft sensor 37, and a water temperature sensor 38 that detects the cooling water temperature of the engine 10. The crank shaft sensor 36 and the cam shaft sensor 37 generate a rotation signal (signal Ne) and a cylinder identification signal (signal G), respectively.

The spark plug 18 is connected to an igniter 39, and the spark plug 18 is energized by the application of high voltage from the igniter 39. A control unit 40 (engine ECU) is connected to the airflow meter 34, the throttle sensor 35, the crank shaft sensor 36, the cam shaft sensor 37 and the water temperature sensor 38. Based on signals from such sensors, the control unit 40 controls the injector 30 and the igniter 39.

Figure 2:
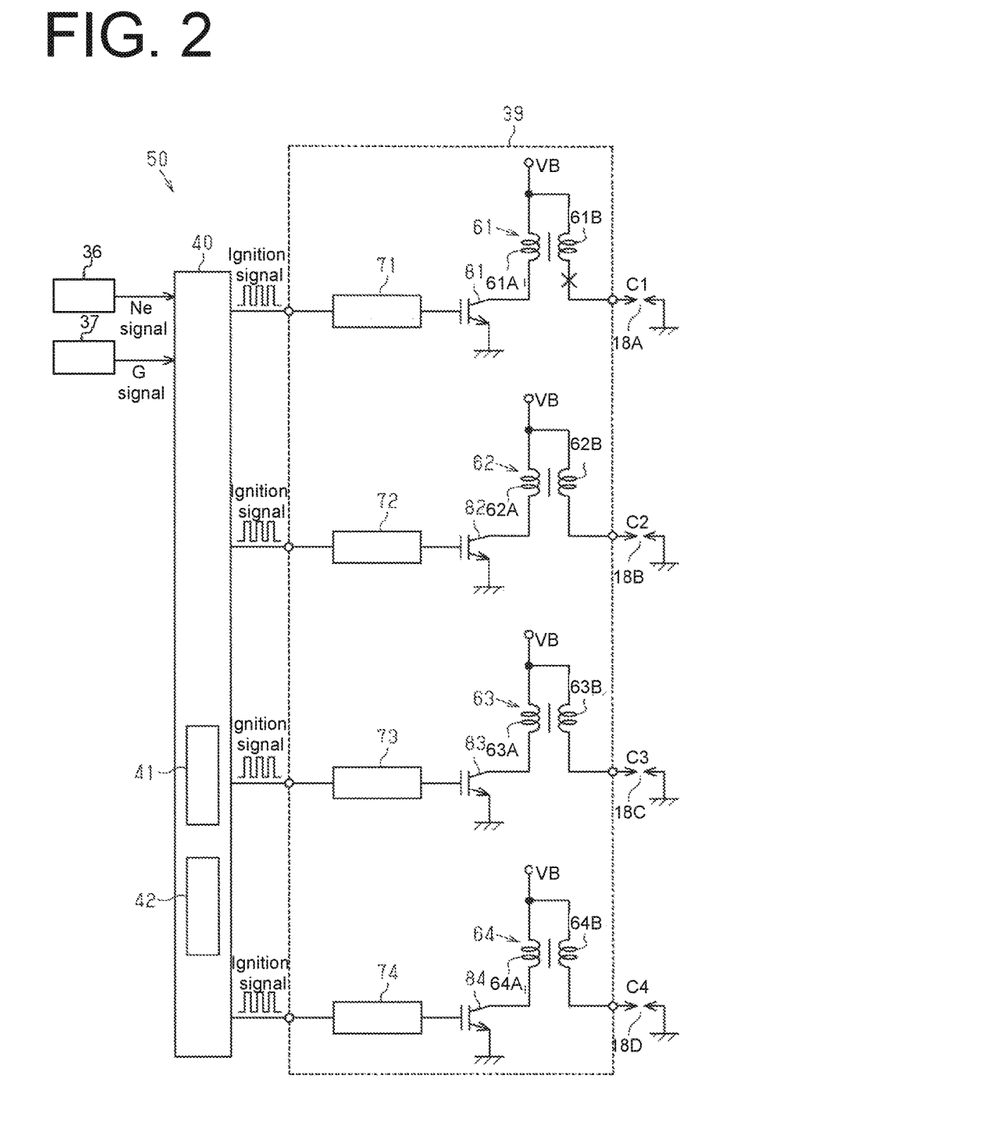
FIG. 2 is a schematic view showing a structure of the ignition device of the engine of FIG. 1.

Numeral 50 in FIG. 2 designates an ignition device of the engine 10. The ignition device 50 includes the aforementioned control unit 40 that includes a microcomputer 41 and a memory 42, and the igniter 39. The ignition device 50 has therein a control system that is operated by the microcomputer 41 and includes a diagnosis function that detects a misfire and malfunction of the igniter 39. The igniter 39 includes ignition coils 61, 62, 63, 64, drive circuits 71, 72, 73, 74 and switching elements 81, 82, 83, 84 for each cylinder.

The engine 10 has four cylinders, namely the first cylinder C1, the second cylinder C2, the third cylinder C3 and the fourth cylinder C4. The first cylinder C1 has a spark plug 18A that corresponds to the ignition coil 61, the drive circuit 71 and the switching element 81 of the igniter 39. Similarly, the second cylinder C2 has a spark plug 18B corresponding to the ignition coil 62, the drive circuit 72 and the switching element 82, the third cylinder C3 has a spark plug 18C corresponding to the ignition coil 63, the drive circuit 73 and the switching element 83, and the fourth cylinder C4 has a spark plug 18D corresponding to the ignition coil 64, the drive circuit 74 and the switching element 84, respectively.

The ignition coils 61, 62, 63, 64 include primary windings 61A, 62A, 63A, 64A, respectively, which are connected in series to their corresponding switching elements 81, 82, 83, 84, respectively. The switching elements 81, 82, 83, 84 are earthed on the side thereof that is connected to the primary windings 61A, 62A, 63, 64A of the ignition coils 61, 62, 63, 64, and the primary windings 61A, 62A, 63A, 64A are connected on the side thereof opposite from the switching elements 81, 82, 83, 84 to a battery mounted on a vehicle. When the switching elements 81, 82, 83, 84 are tuned on, battery voltage VB is applied to the primary windings 61A, 62A, 63A, 64A of the ignition coils 61, 62, 63, 64. The ignition coils 61, 62, 63, 64 includes secondary windings 61B, 62B, 63B, 64B, respectively, having one end thereof connected to the battery and the other end thereof to the spark plugs 18A, 18B 18C, 18D for the respective cylinders.

The control unit 40 is connected to and sends an ignition signal to the drive circuits 71, 72, 73, 74 for the respective cylinders, which causes the corresponding switching elements 81, 82, 83, 84 to be turned on.

Based on the ignition signals from the control unit 40, a primary current (or an electric current to the primary windings 61A, 62A, 63A, 64A) is supplied to the ignition coil 61, 62, 63, 64 and then stopped. Such supply and stop of the primary current generates high voltage on secondary side of the ignition coil 61, 62, 63, 64 (or the secondary windings 61B, 62B, 63B, 64B), which cause a spark to the spark plugs 18A, 18B, 18C, 18C to ignite air-fuel mixture in the cylinder of the engine 10.

Figure 3:
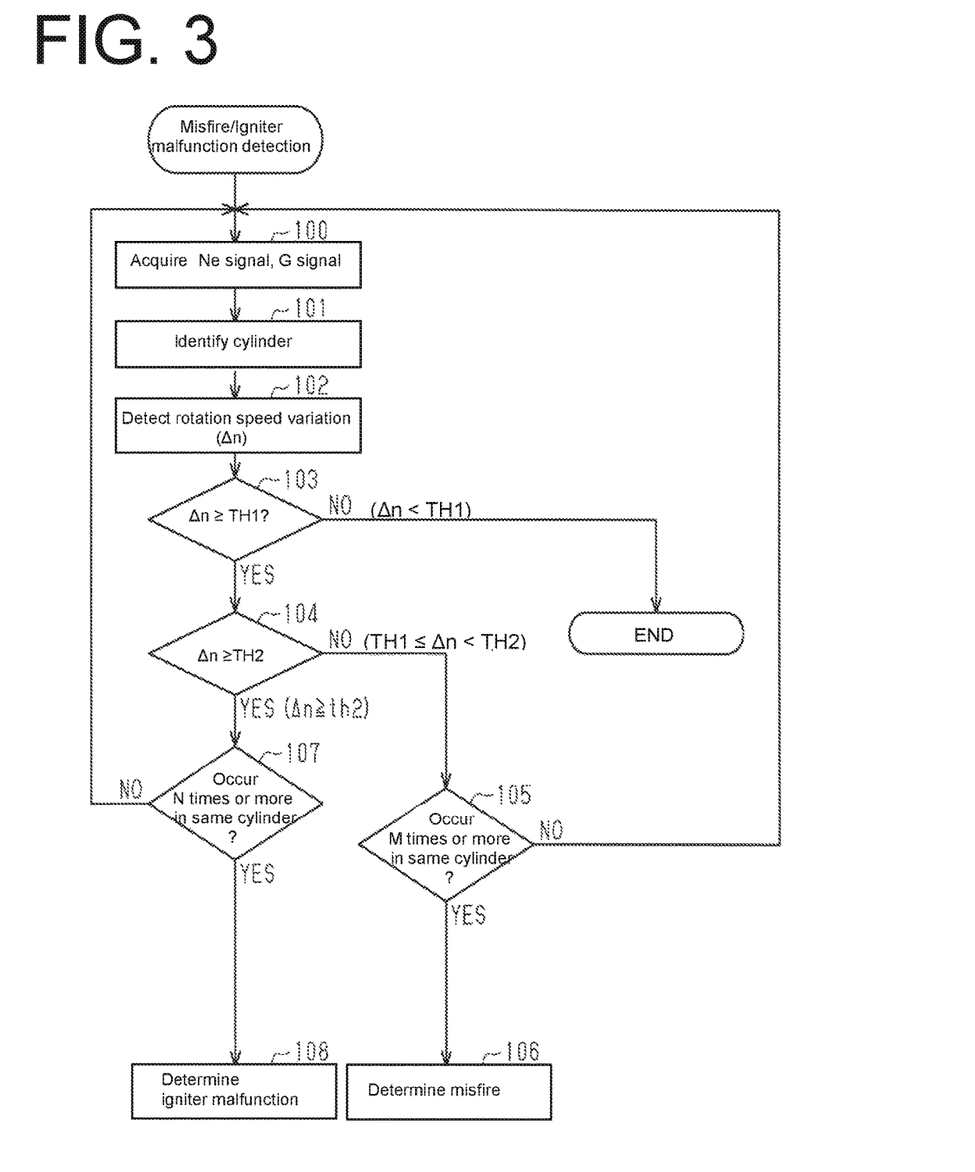
FIG. 3 is a flow chart for detection of misfire and igniter malfunction.
Figure 4A:
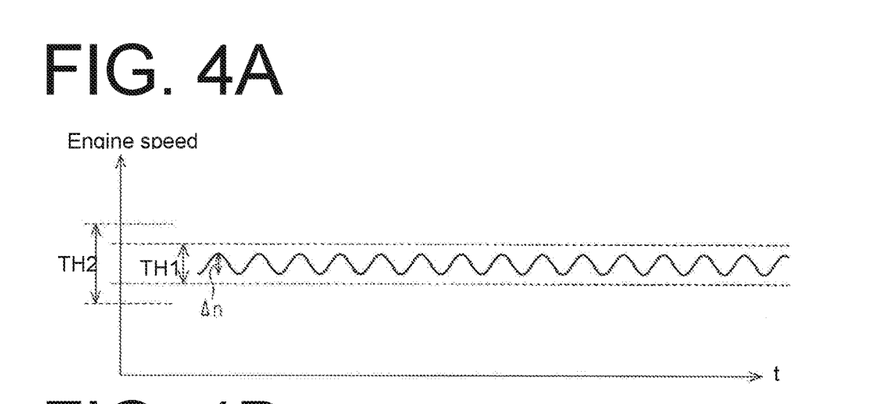
FIGS. 4A, 4B and 4C are time charts showing an engine speed fluctuation to describe the misfire and the igniter malfunction detection.
Figure 4B:
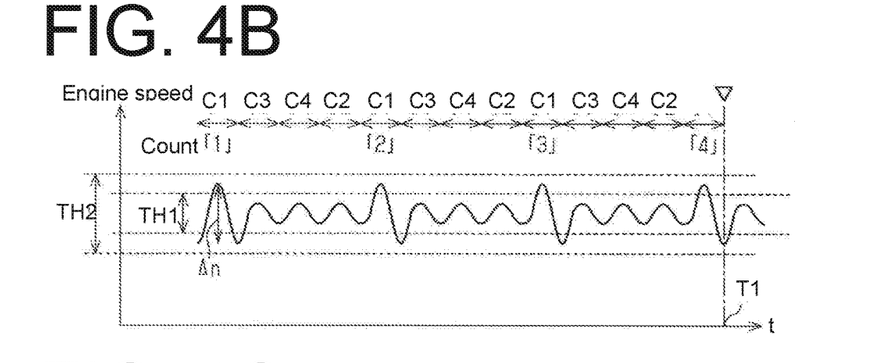
Figure 4C:
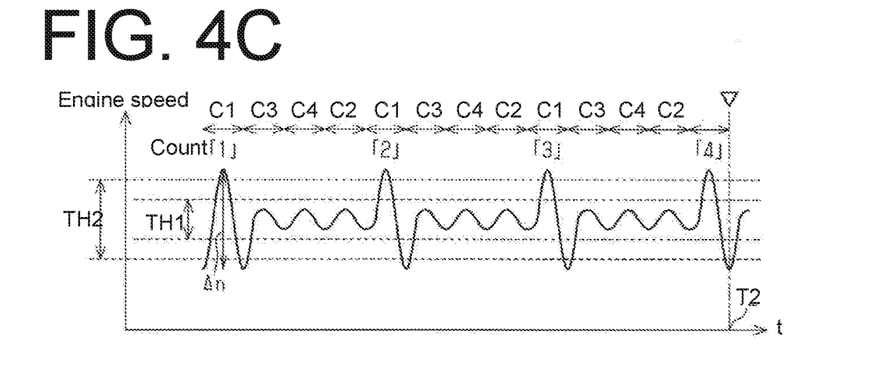
Figure 5:
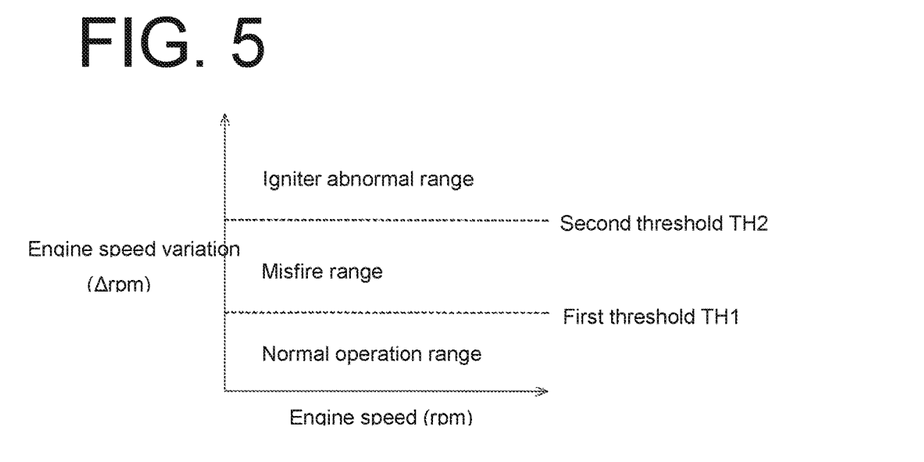
FIG. 5 is a graph describing the thresholds of an engine speed variation.

The following will describe the operation of the ignition device 50 of the engine 10 with reference to FIGS. 3, 4 and 5. The microcomputer 41 of the control unit 40 performs a misfire and igniter malfunction detection in accordance with the flow chart shown in FIG. 3. Referring to FIGS. 4A, 4B and 4C, there is shown three different patterns of engine speed variation. In FIGS. 4A, 4B and 4C, Δn represents engine speed variation, or the engine speed difference between the maximum engine speed and the minimum engine speed per cycle of each cylinder of the engine 10. Referring to FIG. 5, there is shown a first threshold TH1 and a second threshold TH2 of the engine speed variation Δn and data of such first and second thresholds TH1 and TH2 is stored in the memory 42 of the control unit 40. As is apparent from FIG. 5, the values of the first threshold TH1 and the second threshold TH2 are fixed, and the second threshold TH2 is greater than the first threshold TH1.

Referring to FIG. 3, the microcomputer 41 of the control unit 40 receives a signal Ne from the crank shaft sensor 36 and a signal G from the cam shaft sensor 37 at step 100. Based on the signals Ne and G, the microcomputer 41 identifies the cylinder at step 101 and determines the engine speed variation Δn at step 102.

At steps 103 and 104, the microcomputer 41 of the control unit 40 determines whether or not (A) the engine speed variation Δn is smaller than the first threshold TH1, whether or not (B) the engine speed variation Δn is at the first threshold TH1 or higher and smaller than the second threshold TH2, or (C) the engine speed variation Δn is at the second threshold TH2 or higher.

If the engine speed variation Δn is smaller than the first threshold TH1 or (A) at step 103, the engine speed variation Δn is considered to occur as indicated by a pattern shown in FIG. 4A, so that the microcomputer 41 determines that there occurs neither misfire nor igniter malfunction and, therefore, the program proceeds to END.

If the engine speed variation Δn is at the first threshold TH1 or higher and smaller than the second threshold TH2 at steps 103, 104, the engine speed variation Δn is considered to occur as indicated by a pattern shown in FIG. 4B, so that the microcomputer 41 determines that there may be misfire and the program proceeds to step 105.

At step 105, the microcomputer 41 of the control unit 40 determines whether or not the engine speed variation Δn being at the first threshold TH1 or higher and smaller than the second threshold TH2 occurs for M times or more continuously in a particular cylinder, wherein M represents a specific number. If YES at 105, or the microcomputer 41 determines that the engine speed variation Δn being at the first threshold TH1 or higher and smaller than the second threshold TH2 has occurred for M times or more continuously in the same cylinder at a timing T1, the program proceeds to step 106. At step 106, the microcomputer 41 determines that misfire has occurred in the cylinder and sends to the memory 42 of the control unit 40 a diagnosis code identifying the failure of misfire for storage of the diagnosis code data in the memory 42. For example, in FIG. 4B, the engine speed variation Δn being at the first threshold TH1 or higher and smaller than the second threshold TH2 has occurred for M times continuously in the first cylinder C1, which indicates that the failure of misfire is caused to the spark plug 18A of the first cylinder C1.

Storage of the diagnostic code data in the memory 42 allows service personnel at a repair shop to decode the diagnosis code, show the trouble on a display of an external diagnosis device, and to identify the name of system having the trouble (ignition system), the cause of the trouble (e.g. spark plug failure) and the location of the trouble (i.e. the cylinder in which the trouble occurred). Recording the diagnostic code in which the cylinder having a misfire is identified is useful at the maintenance.

If NO at step 105, or the engine speed variation Δn being at the first threshold TH1 or higher and smaller than the second threshold TH2 is not occurred for M times or more continuously in the particular cylinder, the microcomputer 41 determines that no cylinder has no misfire and returns to step 100.

If YES at step 104, or if the engine speed variation Δn is at or higher than second threshold TH2, the engine speed fluctuation Δn is considered to occur as indicated by a pattern shown in FIG. 4C, so that the microcomputer 41 determines that there may be abnormality with the igniter 39 and the program proceeds to step 107.

At step 107, the microcomputer 41 of the control unit 40 determines whether or not the engine speed variation Δn being at or higher than the second threshold TH2 occurs for N times or more continuously in a particular cylinder, wherein N represents a specific number. If YES at step 107, or if the microcomputer 41 determines that the engine speed variation Δn being at or higher than the second threshold TH2 has occurred for N times or more (for example four time, or N=4, as in FIG. 4C) continuously in the same cylinder, the program proceeds to step 108. At step 108, the microcomputer 41 of the control unit 40 determines that abnormality with the igniter 39 such as cut wire has occurred and sends to the memory 42 of the control unit 40 a diagnosis code including such information for storage of the diagnosis code data in the memory 42. For example, in FIG. 4C, the engine speed variation Δn being at or higher than the second threshold TH2 occurs for N times or more continuously in the first cylinder C1, which indicate the first cylinder C1 has the abnormality with the igniter such as a cut in the wire as indicated by X in the secondary winding 61B of the ignition coil 61 of the first cylinder C1 in FIG. 2.

Storage of the diagnostic code data in the memory 42 allows service personnel at a repair shop to decode the diagnosis code, show the trouble on a display of an external diagnosis device, and to identify the name of system having the trouble (ignition system), the cause of the trouble (e.g. igniter failure) and the location of the trouble (i.e. the cylinder in which the trouble occurred). Recording the diagnostic code in which the cylinder having a misfire is identified is useful at the maintenance.

If NO at step 107, if the engine speed variation Δn being at the second threshold TH2 or higher or more has not been occurred for N times or more continuously the microcomputer 41 determines that there is no abnormality with the igniter 39 and the program returns to step 100.

Referring to FIG. 5, the thresholds TH1, TH2 are set so that the determination by the microcomputer 41 of the control unit 40 of misfire at the spark plug 18 and any failure or abnormality of the ignition device 50 may be made reliably from the detection of the engine speed variation Δn. The ignition device 50 is considered to be operating normally when the engine speed variation Δn remains smaller than the first threshold TH1, which is indicated as "normal operation range" in FIG. 5. It is considered that the igniter 39 is operating normally but misfire occurs in any of the cylinders when the engine speed variation Δn is higher than the first threshold TH1 but smaller than the second threshold TH2, which range is indicated as "misfire range". The igniter 39 is considered to be operating abnormally when the engine speed variation Δn is at or higher than the second threshold TH2, which range is indicated as "igniter abnormal range".

The ignition device 50 according to the present embodiment is capable of identifying the cylinder having a problem. During normal operation of the engine 10, air-fuel mixture drawn into the cylinders is ignited and combusted according to the firing order, in which case the engine speed variation Δn of the engine 10 is small. When a particular cylinder has a problem in association with the igniter or the spark plug, on the other hand, the cylinder having a problem fails to generate desirable torque and cause a large engine speed fluctuation. Using the engine speed signal Ne and the cylinder identification signal G from the crank shaft sensor 36 and the cam shaft sensor 37 to monitor the momentary engine speed fluctuation, the control unit 40 determines whether or not the cylinders have any trouble and whether the problem is a misfire at the spark plug 18 or any abnormality with the igniter.

Thus, the use of the igniter 39 having no abnormality detection circuit but capable of detecting any abnormality of the igniter 39 reduces the cost of the ignition device and improves the serviceability. In other words, any abnormality or trouble with the ignition device 50 may be detected by the control unit 40, with the result that no specific abnormality detection circuit is required by the igniter and the cost may be reduced accordingly. In addition, the absence of the abnormality detection circuit helps to reduce the restriction of the mounting space for the igniter.

The present embodiment offers the following effects.

(1) The ignition device 50 of the engine is formed with the control unit 40 including the microcomputer 41 that functions as an engine speed variation detector that detects an engine speed variation Δn. The microcomputer 41 of the control unit 40 determines a misfire occurs in the cylinder when the engine speed variation is at or higher than a first threshold and smaller than a second threshold that is greater than the first threshold. The microcomputer 41 of the control unit 40 determines an abnormality occurs in the igniter in the cylinder when the engine speed variation is at or higher than the second threshold. As a result, malfunction of the igniter 39 when the engine speed variation Δn is at the second threshold TH2 or higher. According to the present embodiment, therefore, any abnormality of the ignition device 50 may be detected without using any abnormality detection circuit in the igniter.

(2) The microcomputer 41 of the control unit 40 identifies and records the cylinder where misfire is occurred and also identifies and records the cylinder where the abnormality occurred in the igniter.

The present embodiment may be modified in various manners, as exemplified below.

Figure 6:
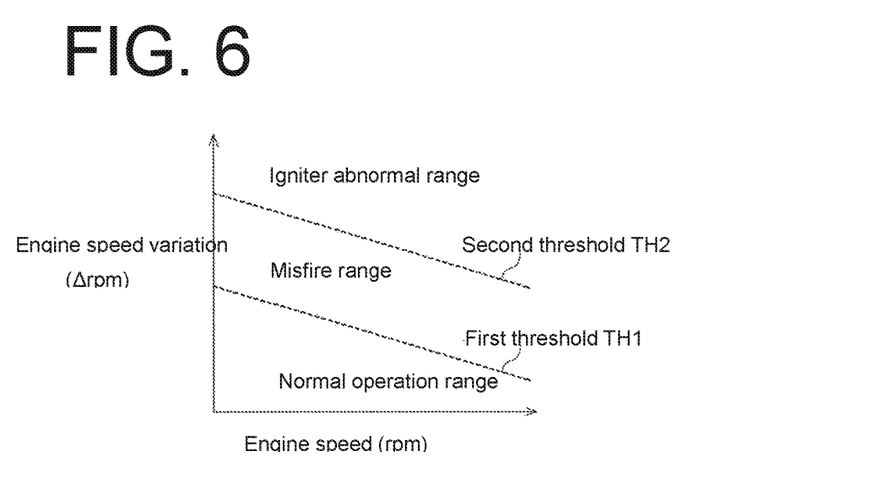
FIG. 6 is a graph showing another example of the thresholds of the engine speed variation.

The first and second thresholds TH1, TH2 need not be fixed throughout the engine speed as shown in FIG. 6. As shown in FIG. 6, the first and second thresholds THA, TH2 may be set so that the threshold values are decreased with an increase of the engine speed.

The first and second thresholds relative to the engine speed may be set as desired for more practical utilization thereof.

The steps 105 and 107 need not be conducted. When the engine speed variation Δn is at the first threshold TH1 or higher and smaller than the second thresholds TH2 in the steps 103 and 104, the microcomputer 41 may determine that there is misfire in the step 106. Additionally, when the engine speed variation Δn is at the second threshold TH2 or higher in the steps 103 and 104, the microcomputer 41 may determine that there is a malfunction in the igniter 39 in the step 108.

When a particular cylinder having a problem is identified, the microcomputer 41 may provide such information of alarm to the driver of the vehicle, as well as such records such information.

Although the engine speed variation is determined by the deference between the maximum engine speed and the minimum engine speed in the present embodiment, the engine speed per unit time may be used to determine the engine speed variation.

The present invention is applicable to an engine having any number of cylinders.

What is claimed is:

1. An ignition device of an engine comprising:
a control unit generating an ignition signal; and
an igniter including an ignition coil having a primary winding and a secondary winding, wherein supply and stop of a current to the primary winding are performed based on the ignition signal from the control unit to generate high voltage in the secondary winding thereby to cause a spark to a spark plug provided for a cylinder of the engine,
wherein the control unit includes an engine speed variation detector that detects an engine speed variation,
wherein the control unit determines a misfire occurs in the cylinder when a number of times the engine speed variation is at or higher than a first threshold and smaller than a second threshold, that is greater than the first threshold, is above a predetermined number of times, and wherein the control unit determines an abnormality occurs in the igniter in the cylinder when the engine speed variation is at or higher than the second threshold.

2. The ignition device of the engine according to claim 1, wherein the engine comprises a plurality of cylinders, wherein the control unit identifies and records the cylinder in which the misfire occurred, and wherein the control unit identifies and records the cylinder in which the abnormality occurred in the igniter.

3. The ignition device of the engine according to claim 1, wherein the first threshold and the second threshold are set relative to an engine speed.

* * * * *